Figure 1:
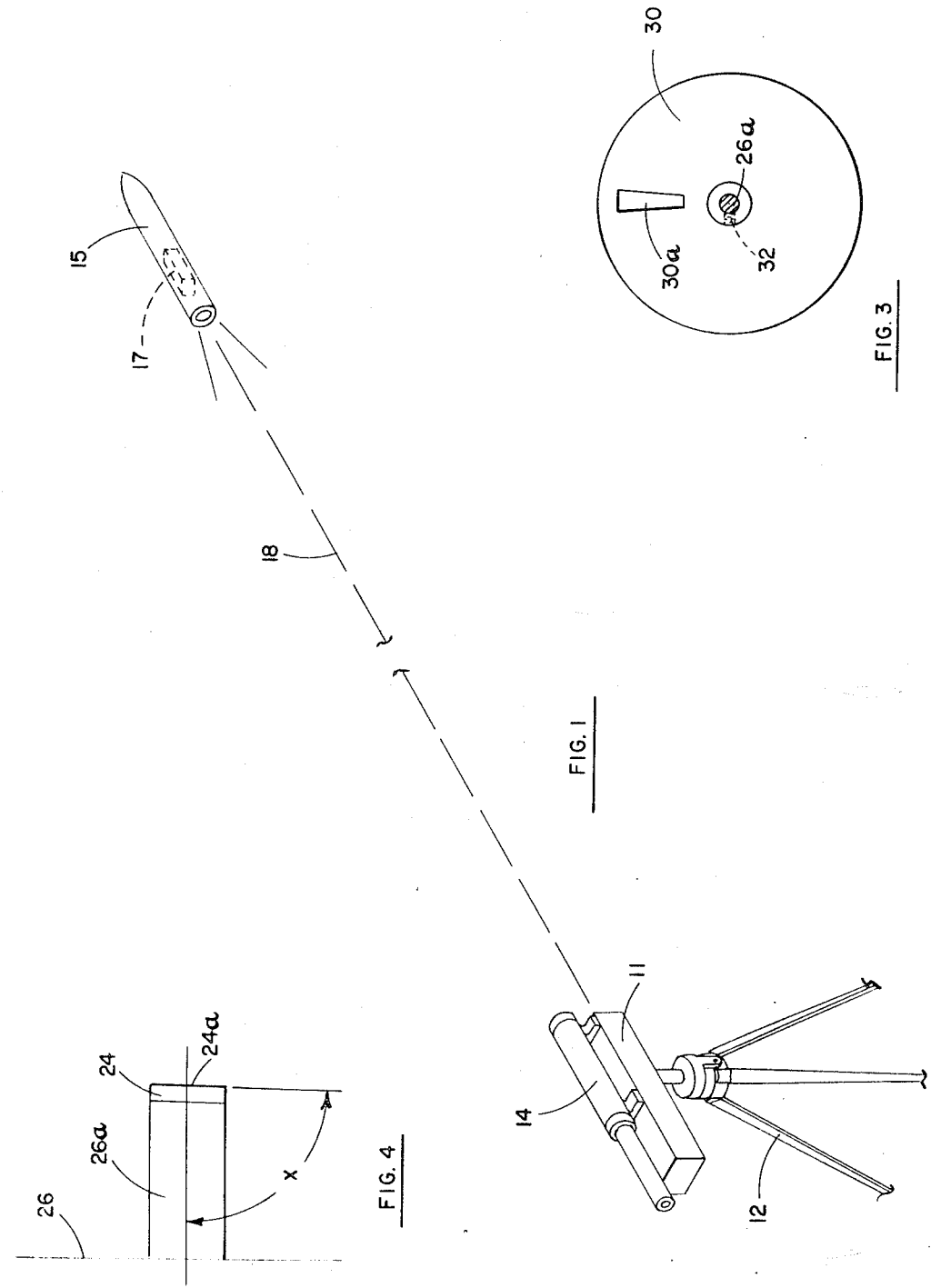

United States Patent [19]
Coxe et al.

[11] 3,746,280
[45] July 17, 1973

[54] VEHICLE GUIDANCE SYSTEM UTILIZING CONICAL SCAN CONTROL BEAM

[75] Inventors: Frank S. Coxe, Santa Ana; Ronald G. Eguchi, Torrance, both of Calif.

[73] Assignee: Northrop Corporation, Los Angeles, Calif.

[22] Filed: Jan. 28, 1972

[21] Appl. No.: 221,722

[52] U.S. Cl. ................................ 244/3.13, 244/3.16
[51] Int. Cl. ................................................ F41g 7/00
[58] Field of Search .......................... 244/3.13, 3.16

[56] References Cited
UNITED STATES PATENTS
3,182,930  5/1965  Randolph, Jr. et al. ............ 244/3.13
3,255,984  6/1966  Hawes ................................ 244/3.13
3,614,025  10/1971  Maillet .............................. 244/3.13

*Primary Examiner*—Samuel Feinberg
*Attorney*—W. M. Graham

[57] ABSTRACT

A reference signal generated in a receiver on a vehicle to be controlled is phase locked with a reference signal generated in a transmitter at a control station, prior to separation of the vehicle from the station. A conically scanned electromagnetic guidance beam containing a boresight axis is radiated out from the station and is used to guide the vehicle along this boresight axis, the direction of the boresight axis from the station being positionable. This end result is achieved by means of the receiver on the vehicle which receives the electromagnetic signal generated by the transmitter and develops elevation and azimuth control signals whenever the vehicle deviates from a position centered along the boresight axis; such deviation being indicated by a phase difference between the conical scanning modulation pattern of the received signal and the receiver reference signal. These control signals may be used to maintain the vehicle centered along the boresight axis.

15 Claims, 8 Drawing Figures

PATENTED JUL 17 1973  3,746,280

SHEET 1 OF 4

PATENTED JUL 17 1973 3,746,280

SHEET 4 OF 4

TO PHASE
DETECTOR
CIRCUITS

VEHICLE GUIDANCE SYSTEM UTILIZING CONICAL SCAN CONTROL BEAM

This invention relates to a vehicle guidance system utilizing electromagnetic guidance means, and more particularly to such a system employing a conically scanned control beam along which the vehicle is maintained centered.

Guidance systems for airborne vehicles, such as missiles, aircraft drones and the like, which utilize electromagnetic control beams radiated from a ground station are used extensively, particularly for military applications and space control missions. Many of these systems utilize radio control beams which carry the control signals for the vehicle. Such control signals are usually vulnerable to countermeasures such as jamming and the use of window and chaff, which of course deteriorates the effectiveness of the control. One technique for minimizing the effect of such countermeasures is to generate the needed control signals in the vehicle transmitting a beam with minimal information on it from the ground. Thus, as long as the beam is not totally obliterated, some control action can be effected. This generally, however, involves rather complicated control equipment on the vehicle which is both expensive and space consuming, this being particularly disadvantageous in the case of a missile which is expended and in which it is desirable to minimize the load.

Systems have been developed in the prior art, such as described in U.S. Pat. No. 3,513,315, which involve the use of a control beam radiated from a ground control station which is modulated with a nutation pattern, this pattern then being processed at the vehicle to enable maintenance of line of sight positioning of the vehicle relative to the station. This system, while it overcomes the aforementioned shortcomings of prior art systems, is somewhat overly complicated in its implementation involving complex prism and lens arrangements in processing the control signals, as well as somewhat heavy and complex time interval circuitry in the guided vehicle.

The system of this invention minimizes the vulnerability to countermeasures such as jamming and the like by developing all of the control signals on the vehicle, the transmitted beam including a minimum amount of information, but at the same time avoids the use of complex, heavy, or bulky control equipment on the vehicle, such equipment and its circuitry being relatively simple and inexpensive in its implementation.

Further, the system of this invention makes use of a coherent light beam which may be developed by a laser, which affords in a simple fashion a very narrow and directive beam for accurate vehicle control.

It is therefore an object of this invention to facilitate the control of a vehicle from a ground station.

It is another object of this invention to provide a control system for controlling a vehicle from a ground station which is relatively simple and economical.

It is still a further object of this invention to provide a vehicle control system utilizing a control beam which is less prone to be affected by countermeasures than certain prior art systems.

Figure 2:
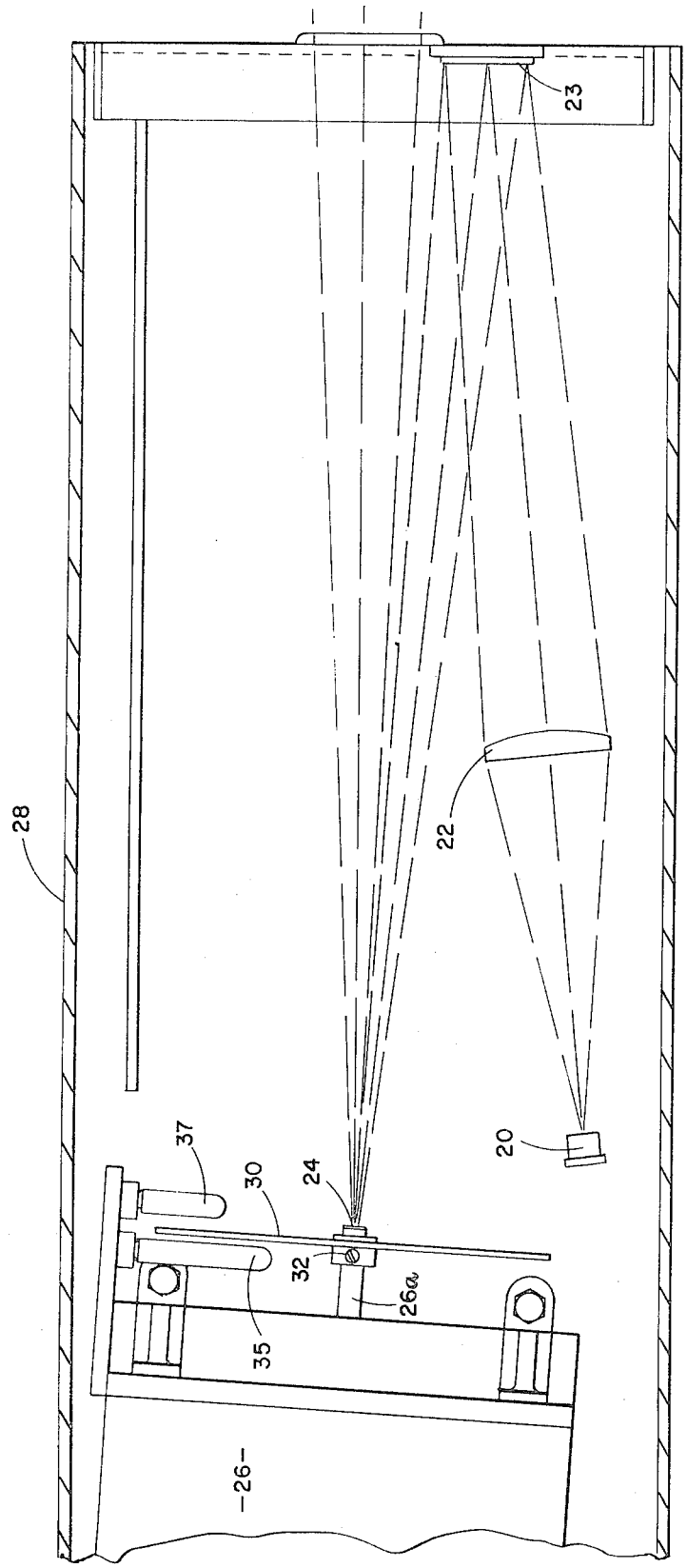
Figure 5:
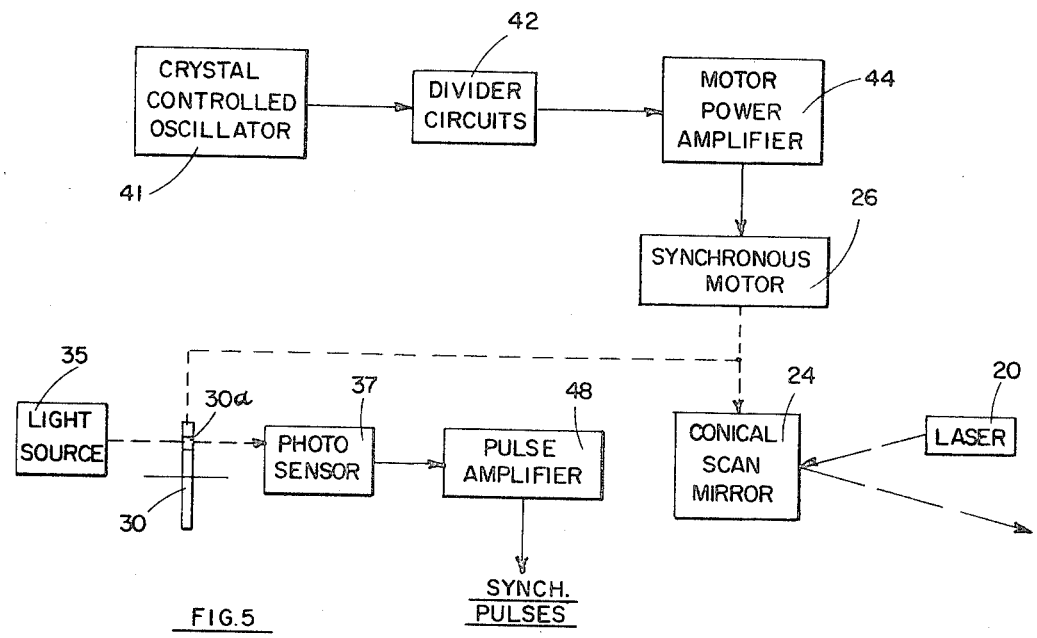
Figure 6:
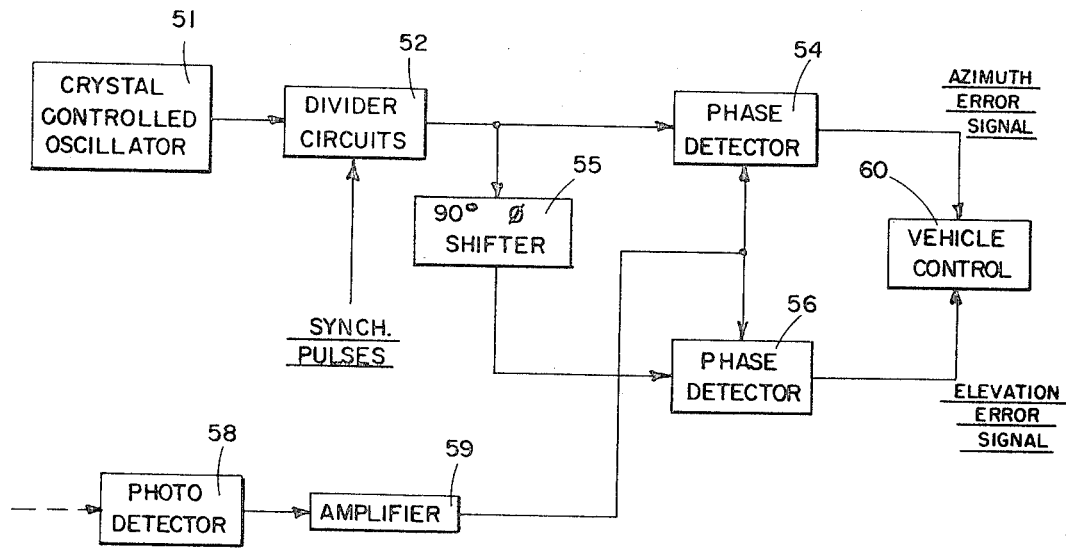
Figure 7:
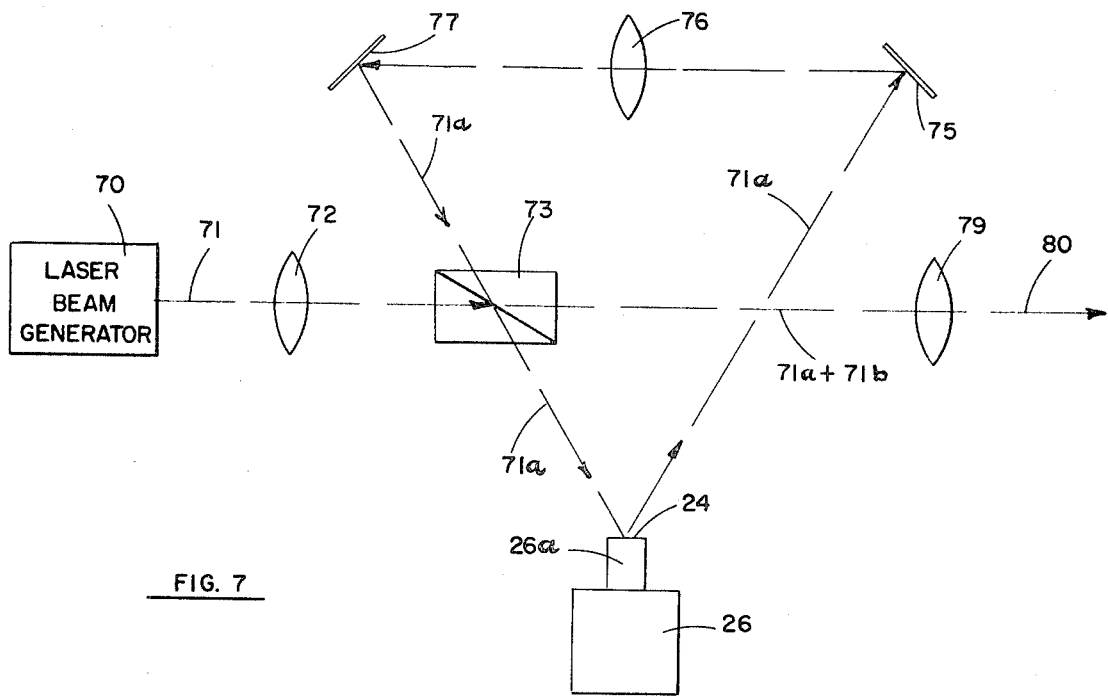
Figure 8:
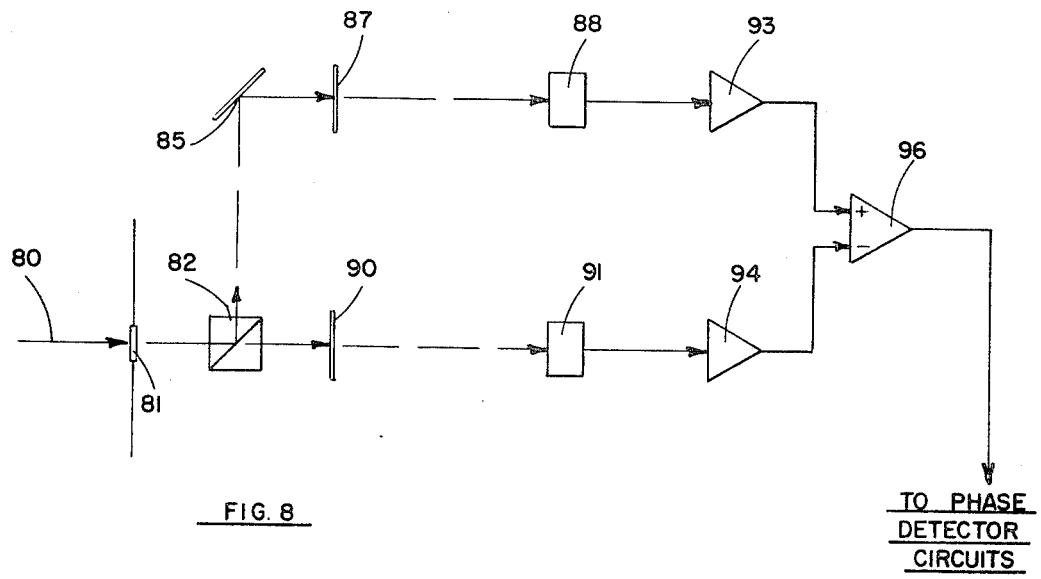

Other objects of this invention will become apparent as the description proceeds in connection with the accompanying drawing, of which:

FIG. 1 is a schematic drawing illustrating one embodiment of the invention as being used to control a missile, FIG. 2 is a schematic drawing illustrating one embodiment of the transmitter of the invention, FIG. 3 is an elevational view illustrating the construction of the reference generator disc of the embodiment of FIG. 2, FIG. 4 is a side elevational view illustrating the scanning mirror structure of the embodiment of FIG. 2, FIG. 5 is a functional block diagram illustrating the circuitry of one embodiment of the transmitter of the invention, FIG. 6 is a functional block diagram illustrating the circuitry of one embodiment of the receiver of the invention, FIG. 7 is a schematic illustration illustrating the transmitter of a second embodiment of the invention, and FIG. 8 is a functional schematic illustrating the receiver of this second embodiment.

Briefly described, the system of the invention comprises a transmitter at a ground station for transmitting a beam of electromagnetic energy. In the preferred embodiment, the beam of energy is a light source generated by means of a laser, the illumination of which is conically scanned or nutated at an accurately controlled frequency by means of a motor-driven mirror. A reference signal, indicative of the "zero" phase condition of the scan, is developed in the transmitter by means of a reference disc which is rotated by the same motor that drives the mirror. A precisely controlled reference signal in the receiver on the vehicle to be controlled is precisely synchronized with the transmitter reference signal prior to the departure of the vehicle from the control station. With the vehicle in transit, this receiver reference signal is phase compared with the modulation pattern on the signal received from the transmitter and control signals generated in accordance with phase differences between the two signals indicative of departure in either azimuth or elevation from the center of the beam. These control signals are utilized to maintain the vehicle in a position centered on the beam.

Referring now to FIG. 1, one example of the utilization of the system of the invention is schematically illustrated. Transmitting unit 11 is supported on the ground by means of stand 12 which has bearings to permit manual positioning of the transmitter unit in both azimuth and elevation. Supported on transmitting unit 11 is a telescope 14. The boresight of the telescope is aligned with that of the transmitting unit, so that the telescope can be used in aligning the transmitting unit with the vehicle 15 to be controlled. Vehicle 15, which may comprise a missile, has a receiver unit 17 mounted therein for receiving the signals generated by transmitting unit 11.

Before missile 15 is fired, with the receiver and transmitter in proximity to each other, the synchronizing circuits of receiver 17 are phase locked with the synchronizing circuits of transmitter 11, as to be explained further on in the specification. The missile is then fired and optically sighted in telescope 14 by manual positioning by an operator. Once the transmitter unit 11 has been thus aligned with the missile, the missile will remain in alignment along the transmitter's radiation beam boresight axis 18 automatically, this end result being implemented by control circuitry in the missile which responds to error signals generated if the missile should depart from the beam. The flight of the missile thus can be controlled by positioning transmitter 11 in both azimuth vnd elevation. Beam 18 may be a light beam such as generated by a laser.

Referring now to FIGS. 2–4, one embodiment of a transmitter which may be utilized in the system of the invention is illustrated. A pulsating laser beam is generated by laser diode 20 and focused by means of lens 22 onto conical scanning mirror 24, the beam being reflected onto the scanning mirror surface by means of a mirror 23. Scanning mirror 24 is attached to the shaft 26a of synchronous motor 26 and is rotatably driven by the motor at a precise synchronized frequency which, as to be explained further on in the specification in connection with FIG. 5, is generated by a highly accurate and stable signal generator.

As can best be seen in FIG. 4, scanning mirror 24 has a flat surface 24a, the plane of this surface being slightly canted with respect to the rotation axis of motor shaft 26a. In an operative embodiment of the device of the invention, this cant angle used is 0.4°. This results in a 0.8° nutation of the beam about the boresight axis of shaft 26a at the synchronous rotation rate of such shaft. It is to be noted that mirror 23 is utilized to save space by doubling back the optical path and could be eliminated, if such space considerations were not a factor, by positioning laser diode 20 directly opposite scanning mirror 24 at a distance necessary for optical focusing. It is also to be noted that motor 26 is angled slightly with respect to casing 28 on which the telescope 14 shown in FIG. 1 is mounted, this in order to achieve alignment between the beam and the boresight axis of the telescope.

Mounted on shaft 26a for rotation therewith is disc 30 which has a longitudinal window 30a running along a radius thereof. Disc 30 is attached to shaft 26a by means of set screw 32 and thus can be aligned in any desired radial position along the circumference of the shaft. As can be seen in FIG. 2, a lamp 35 is positioned on one side of disc 30 with a photo detector 37 being positioned on the opposite side thereof. Lamp 35 could be a conventional incandescent pilot lamp, while photodetector 37 a commercially available photo diode. With each rotation of disc 30, as window 30a arrives between lamp 35 and photodetector 37, a light pulse will be passed through the disc to the photodetector, the photodetector in response to this light pulse generating a corresponding electrical pulse. As to be explained further on in the specification, these electrical pulses are utilized to synchronize the operation of the receiver. In order to assure accurate operation of such synchronization, disc 30 must be aligned with scanning mirror 24 such that window 30a appears between lamp 35 and photodetector 37 at the start of each scanning cycle (or ate least at some predetermined point in each such cycle).

Referring now to FIG. 5, a functional block diagram of a transmitter which may be utilized in the illustrative embodiment is shown. Crystal controlled oscillator 41 is a highly accurate crystal oscillator having zero temperature coefficient and which may operate at a frequency of the order of 3kHz. This oscillator is utilized as a synchronization frequency reference source and therefore must be highly accurate. Such oscillators are generally commercially available.

The output of oscillator 41 is divided by means of divider circuits 42 down to a frequency of the order of 60 Hz. The output of divider circuits 42 is amplified in motor power amplifier 44 which provides power for driving synchronous motor 26. This motor, as already noted in connection with FIGS. 2–4, drives conical scan mirror 24 and synchronization disc 30 at the precisely controlled synchronous frequency. Light source 35, which may comprise a pilot lamp, is placed on one side of disc 30 while photosensor 37 is placed on the opposite side thereof, light passing through window 30a at a predetermined time during each rotation cycle of synchronous motor 26. The structure of these components is shown in FIGS. 2–4 and described in connection therewith.

The output of photosensor 37 which is a series of electrical pulses corresponding to the light pulses passed through window 30a, is amplified in pulse amplifier 48. The output of pulse amplifier 48 is a series of synch pulses which are utilized to synchronize the operation of the receiver prior to the launching of the vehicle. These synch pulses, as to be described in connection with FIG. 6, are fed to the divider circuits of the receiver. As already described in connection with FIGS. 2–4, the light output of laser 20 is reflected by conical scan mirror 24, the light beam being nutated in accordance with the conical scan pattern of the mirror.

Referring now to FIG. 6, a functional block diagram is shown of a receiver which may be utilized in the system of the invention. The receiver has a crystal controlled oscillator 51 which is similar and has the same frequency of operation as transmitter oscillator 41. The output of crystal controlled oscillator 51 is divided down by means of divider circuits 52 to the same frequency as the output of divider circuits 42. The output of divider circuits 52 is phase synchronized with the rotation of synchronous motor 26 by means of synch pulses which are fed thereto from pulse amplifier 48 of the transmitter. This end result may be achieved by means of an umbilical interconnecting the transmitter and receiver before the vehicle is launched, this umbilical being disconnected immediately prior to or upon takeoff. The output of divider circuits 52 is fed to phase detector 54. A portion of this signal is 90° phase shifted by means of phase shifter 55, this phase shifted output being fed to phase detector 56.

The nutated light output of the transmitter is received by photodetector 58 which may comprise a photo diode. The output of photodetector 58 is amplified and processed by means of amplifier 59, this amplified output signal being fed to both phase detector 54 and phase detector 56. Phase detectors 54 and 56 each generate output signals having an amplitude and polarity in accordance with the phase relationship of the inputs fed thereto for comparison. Thus, phase detector 54 generates an output signal in accordance with the phase relationship between the output of divider circuits 52 which is synchronized with the conical scanning of the light beam and the input signal received by the receiver. Phase detector 56 generates an output in accordance with the phase relationship between a signal phase shifted 90° from this synchronized reference signal and the received signal.

It will be apparent that where the vehicle is aligned with the beam in azimuth, the phase relationship between the two signals fed to phase detector 54 will be 90°, and thus the DC output of this phase detector will be zero. On the other hand, whenever the vehicle starts to depart from alignment in azimuth, an azimuth error signal will be generated by the phase detector which will have a polarity indicative of the direction of departure as well as a magnitude corresponding to the amount of error. This signal is fed to vehicle control 60, which controls the vehicle such as to bring this error signal to zero.

Similarly, departures of the vehicle from alignment with the beam in elevation will be detected by phase detector 56 and an elevation error signal generated in accordance therewith, this elevation error signal being utilized to control the vehicle to restore alignment in elevation.

Referring now to FIG. 7, the transmitter of an improvement over the system just described is schematically illustrated. This imrpovement is useful in situations where the radiation beam is emitted from a laser and the transmission path is relatively long (of the order of 500 feet or more), and noise is likely to appear on the signal due to such factors as atmospheric refraction and laser diode "flicker." This is likely to cause errors to arise in the signal. The improvement now to be described minimizes such errors by effectively subtracting such noise out of the signal.

As shown in FIG. 7, a laser beam 71 is emitted by laser beam generator 70, which may comprise a laser diode. This beam is focused by means of lens 72 onto beam splitter and polarizer 73. Beam splitter and polarizer 73 may comprise a calcite crystal or a polaroid filter system. The beam is split into a first component 71a which is reflected onto scanning mirror 24. Scanning mirror 24 is rotatably driven by motor 26 in the same manner as described for the first embodiment so as to nutate the beam. Beam portion 71a is reflected by means of mirror 75 through lens 76 onto mirror 77, and thence back to beam splitter 73 where it is recombined in beam splitter 73 with a portion of the beam 71b that is initially passed directly through the beam splitter. The portion of the beam 71a is horizontally or right circularly or right elliptically polarized, while portion 71b is vertically or left circularly or left elliptically polarized in the beam splitter and polarizer 73. Lens 79 is utilized to focus the beam. The transmitted beam 80 thus has two components which are oppositely polarized respectively, and one of which only is conically scanned.

Referring now to FIG. 8, a schematic drawing of a receiver for handling the two beam components is illustrated. The received beam 80 is focused onto beam splitter 82 by means of lens system 81. The vertical component of the beam is reflected from mirror 85 through horizontal or right circular or right elliptical polarizing filter 87 onto photodetector 88. The vertical or left circular or left elliptical component of the beam is passed through beam splitter 82 and passed through polarized filter 90 onto photodetector 91. The signals are thus separated and amplified respectively in preamplifiers 93 and 94, and fed to differential amplifier 96 wherein they are subtracted from each other. In the subtraction process, noise signals which normally have the same amplitude and polarity in both signal components are subtracted out and thus removed from the output. The output of differential amplifier 96 includes the conical scan modulation pattern and is then processed in the same way as described in connection with FIG. 6 for the first embodiment.

The system of this invention thus provides simple and relatively economical means for controlling a vehicle such as a missile from a ground control station. While the system of the invention has been described and illustrated in detail, it is to be clearly understood that this is intended by way of illustration and example only and is not to be taken by way of limitation, the spirit and scope of this invention being limited only by the terms of the following claims.

We claim:

1. A system for controlling the position of a vehicle with respect to a control station comprising
   a. a transmitter at said station for transmitting a beam of electromagnetic energy, said transmitter including:
      means for generating said beam,
      conical scanning means for nutating the beam,
      means for generating a pulsating signal at a precise frequency,
      drive means responsive to said pulsating signal for driving said scanning means at a precise predetermined scanning frequency, and
      means for generating a synchronization signal indicative of the phase of the conical scan of said beam;
   b. a receiver on said vehicle for receiving said beam, said receiver including:
      means for generating a pulsating signal at the same precise frequency as the pulsating signal generated in said transmitter,
      means responsive to said receiver pulsating signal for providing a beam scanning phase reference signal,
      means for measuring the phase relationship between the conical scan of the received beam and the phase reference signal, said phase relationship indicating deviation of the vehicle from the center of said beam, and
      means for generating control signals in accordance with said phase relationship for maintaining the vehicle on said beam; and
   c. means for feeding said synchronization signal to said receiver pulsating signal generating means, with said vehicle at said station prior to launching thereof, thereby synchronizing the phase reference signal with the nutation of said beam.

2. The system of claim 1 and further including means for manually positioning the transmitter to control the azimuth and elevation of said beam.

3. The system of claim 2 and further including telescopic sighting means for visually aligning the beam with the vehicle.

4. The system of claim 1 wherein said means for generating the beam comprises a laser, said beam being a laser beam.

5. The system of claim 4 wherein said scanning means comprises a motor having a drive shaft, a flat surfaced mirror mounted on said shaft, the plane of the flat surface of the mirror being slightly canted with respect to the shaft rotation axis, said mirror being positioned in the optical path of said beam whereby when the mirror is rotatably driven by said motor, the beam is nutated.

6. The system of claim 1 wherein said means for generating pulsating signals comprises a crystal controlled oscillator and means for dividing the frequency of the oscillator output to said scanning frequency.

7. The system of claim 1 wherein said drive means includes motor drive means responsive to the divided output of said dividing means for rotatably driving said scanning means.

8. The system of claim 7 wherein said means for generating a synchronization signal comprises a disc attached to said motor drive means and having a radial slot formed therein, a light source being positioned on one side of the disc opposite the slot, a light sensor being positioned on the opposite side of the disc opposite the slot, whereby the light sensor generates an output pulse each time the slot appears between the light source and the light sensor.

9. The system of claim 1 wherein said transmitter further includes means for splitting said beam into two components and polarizing each of said components differently, only one of said beam components being nutated, and wherein said receiver includes means for subtracting said beam components to remove noise signals from the composite beam.

10. In a system for controlling the position of a vehicle relative to a control station, said system including transmitter means at said control station for radiating an electromagnetic beam, said beam being nutated at a precise conical scanning frequency, and receiver means on said vehicle for receiving said beam and generating control signals to maintain said vehicle thereon, the improvement comprising:
  a. means in said transmitter for generating a pulsating signal at a precise frequency, said signal providing a drive signal for nutating said beam,
  b. means in said transmitter for generating a synchronization signal indicative of the phase of the nutation of said beam,
  c. means in said receiver for generating a pulsating phase reference signal at the same precise frequency as said beam nutating drive signal,
  d. means in said receiver for providing an output in accordance with the phase relationship between the conical scan pattern of the received beam and said phase reference signal, said phase relationship indicating deviation of the vehicle from the center of the beam,
  e. means for generating control signals in accordance with said phase relationship for maintaining the vehicle on said beam, and
  f. means for feeding said synchronization signal to said receiver pulsating signal generating means, with said vehicle at said station prior to the launching thereof, thereby synchronizing the phase of the reference signal with the nutation of the beam.

11. The system of claim 10 wherein said beam is a laser beam.

12. The system of claim 10 and further including means in said transmitter for splitting said beam into two components and giving said components different polarizations, only one of said components being nutated, said receiver means including means for subtracting said beam components to remove noise from the composite beam.

13. The system of claim 10 wherein said means for generating pulsating signals comprises a crystal controlled oscillator and means for dividing the output of said oscillator to said scanning frequency.

14. The system of claim 10 wherein said means for generating a synchronization signal comprises a disc attached to said motor drive means and having a radial slot formed therein, a light source being positioned on one side of the disc opposite the slot, a light sensor being positioned on the opposite side of the disc opposite the slot, whereby the light sensor generates an output pulse each time the slot appears between the light source and the light sensor.

15. The system of claim 10 and further including telescopic sighting means for visually aligning the beam with the vehicle.

* * * * *